(12) United States Patent
Komori

(10) Patent No.: US 8,794,844 B2
(45) Date of Patent: Aug. 5, 2014

(54) WHEEL BEARING APPARATUS FOR A VEHICLE

(75) Inventor: Kazuo Komori, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/100,429

(22) Filed: May 4, 2011

(65) Prior Publication Data
US 2011/0206307 A1 Aug. 25, 2011

Related U.S. Application Data

(63) Continuation of application No. PCT/JP2009/005845, filed on Nov. 4, 2009.

(30) Foreign Application Priority Data

Nov. 5, 2008 (JP) .................................. 2008-284568

(51) Int. Cl.
*F16C 13/00* (2006.01)
(52) U.S. Cl.
USPC .......................................................... 384/544
(58) Field of Classification Search
USPC ................. 384/544, 589; 29/407.05
See application file for complete search history.

(56) References Cited

U.S. PATENT DOCUMENTS

| | | | | |
|---|---|---|---|---|
| 6,113,279 A * | 9/2000 | Sawai et al. | .................... | 384/537 |
| 6,575,637 B1 * | 6/2003 | Tajima et al. | ................. | 384/544 |
| 6,702,472 B2 * | 3/2004 | Sera et al. | ...................... | 384/489 |
| 7,125,173 B2 * | 10/2006 | Toda et al. | ..................... | 384/544 |
| 7,255,482 B2 * | 8/2007 | Yamamoto | .................... | 384/544 |
| 2005/0111771 A1 * | 5/2005 | Shevket | ........................ | 384/544 |
| 2007/0187004 A1 | 8/2007 | Hirai et al. | | |

FOREIGN PATENT DOCUMENTS

| | | |
|---|---|---|
| CN | 1930401 | 3/2007 |
| EP | 1 731 777 | 12/2006 |
| JP | 10-272903 | 10/1998 |
| JP | 2005-256897 | 9/2005 |
| JP | 2005-289147 | 10/2005 |
| JP | 2006-046353 | 2/2006 |
| JP | 2007-271081 | 10/2007 |
| JP | 2008-157367 | 7/2008 |
| JP | 2008-169941 | 7/2008 |
| JP | 2008-215567 | 9/2008 |
| JP | 2008-247386 | 10/2008 |
| WO | WO2005/088147 | 9/2005 |
| WO | WO2008/059617 | 5/2008 |

* cited by examiner

*Primary Examiner* — Thomas R Hannon
*Assistant Examiner* — Adam D Rogers
(74) *Attorney, Agent, or Firm* — Harness, Dickey & Pierce, P.L.C.

(57) ABSTRACT

A vehicle wheel bearing apparatus has an outer member; an inner member and double row balls freely rollably contained between outer raceway surfaces and inner raceway surfaces. An inner ring is axially secured relative to a wheel hub by a caulked portion. The caulked portion is formed by plastically deforming the cylindrical portion radially outward. The wheel hub is formed from medium-high carbon steel including carbon of 0.40-0.80% by weight and with a ferrite grain size number selected larger than #3.

9 Claims, 4 Drawing Sheets

PCDo>PCDi
do<di
Zo>Zi

[Fig 1]
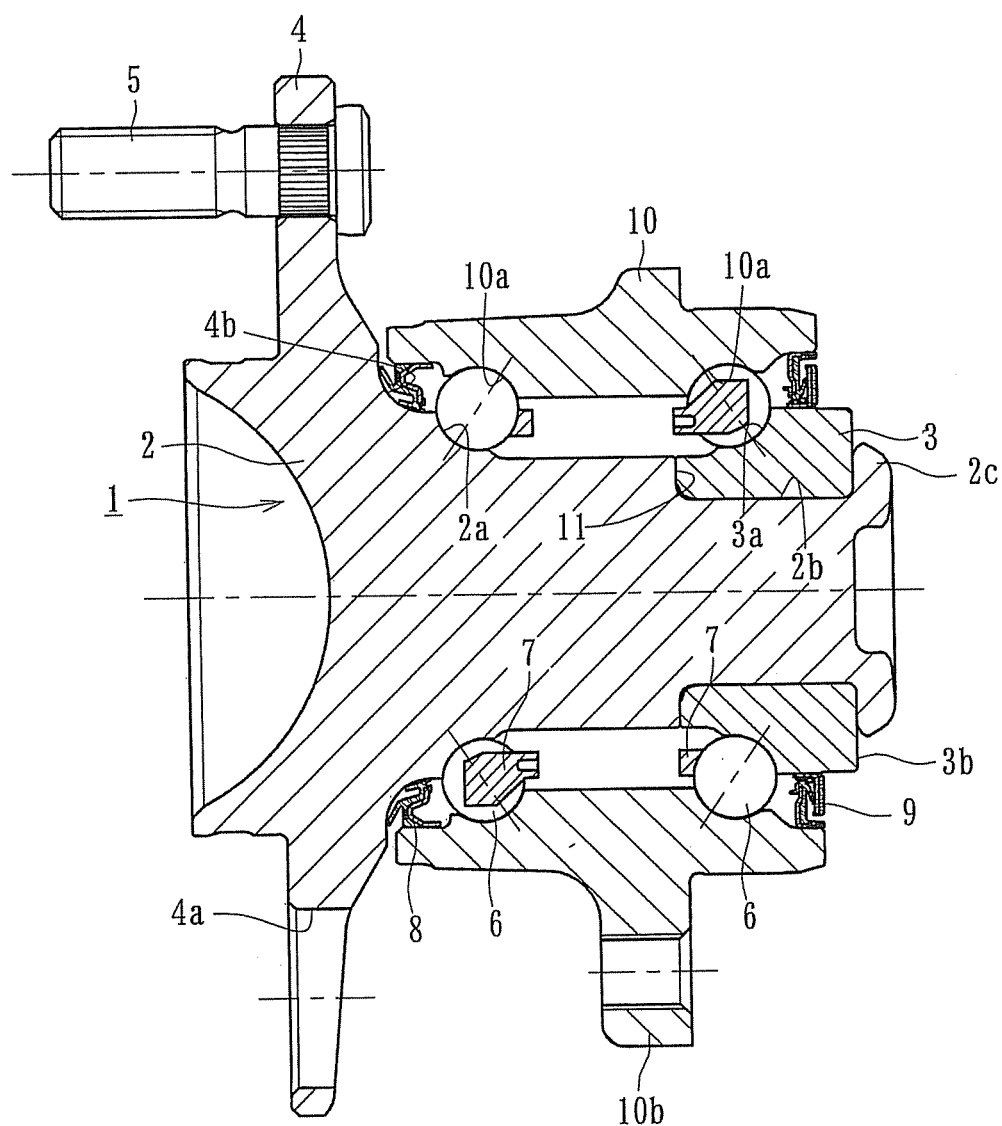

[Fig 2]
(a)
(b)
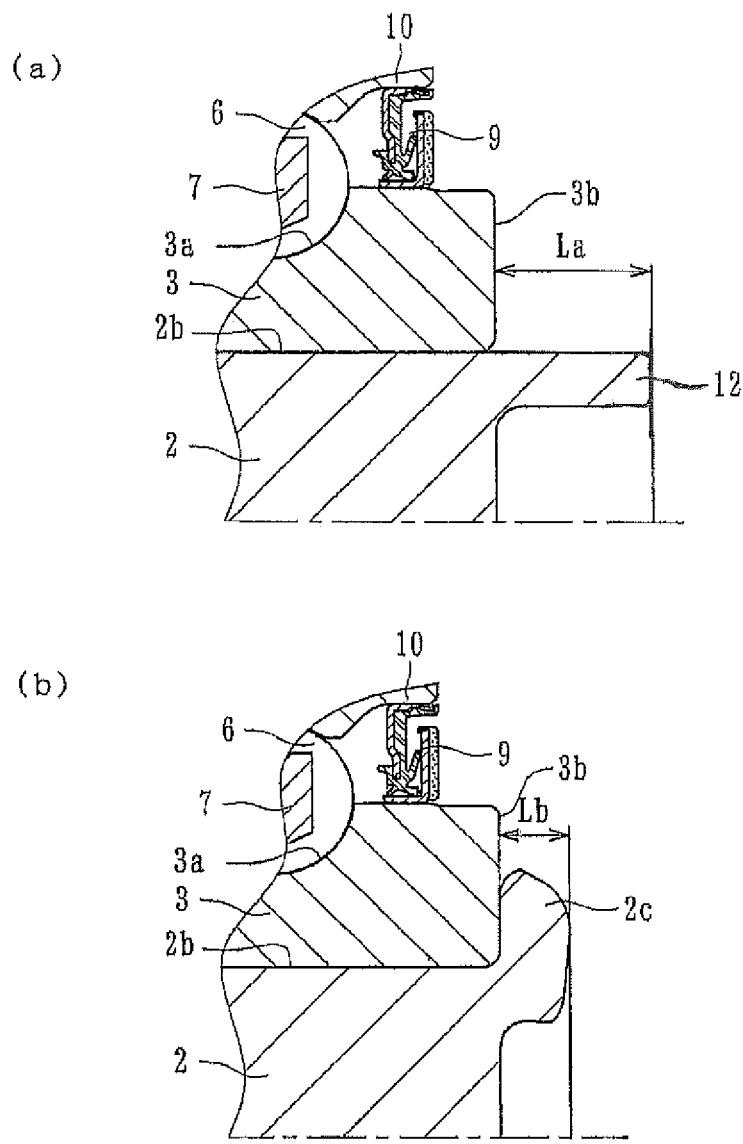
$(La-Lb)/La \leq 0.55$

[Fig 3]
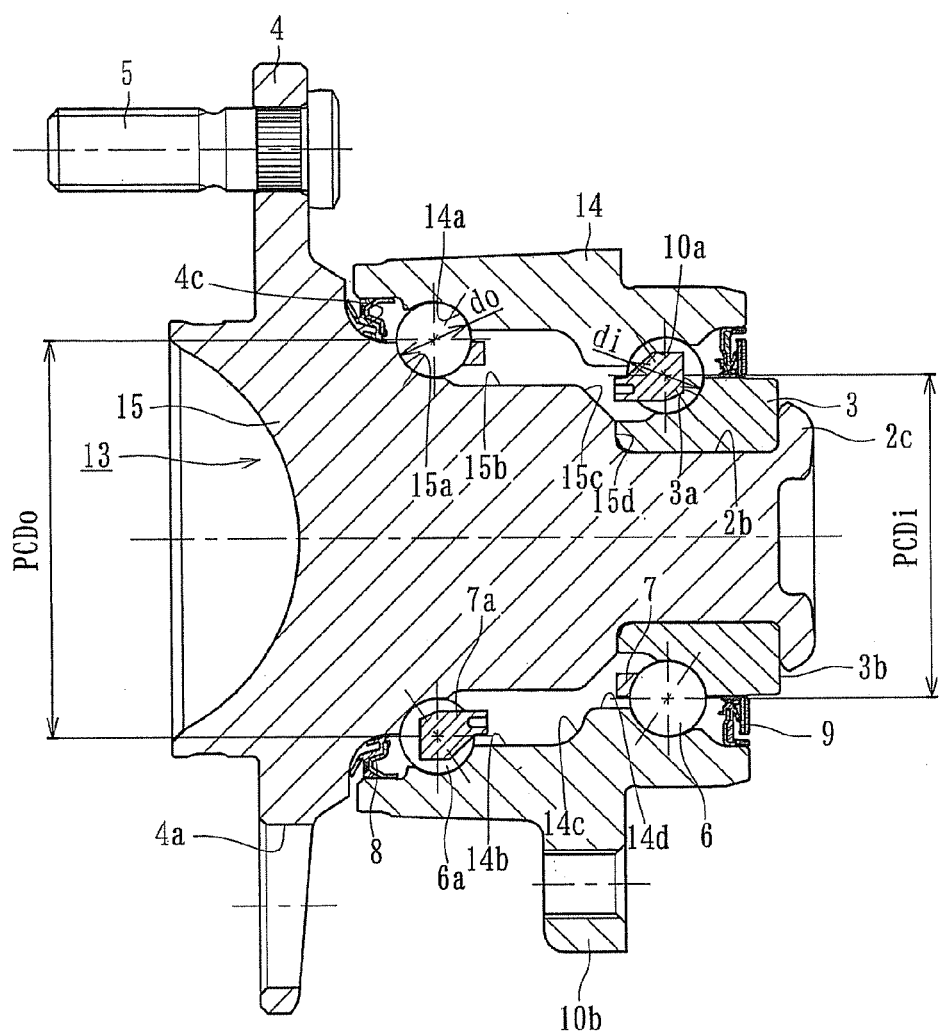
PCDo>PCDi
do<di
Zo>Zi

[Fig 4]
PRIOR ART
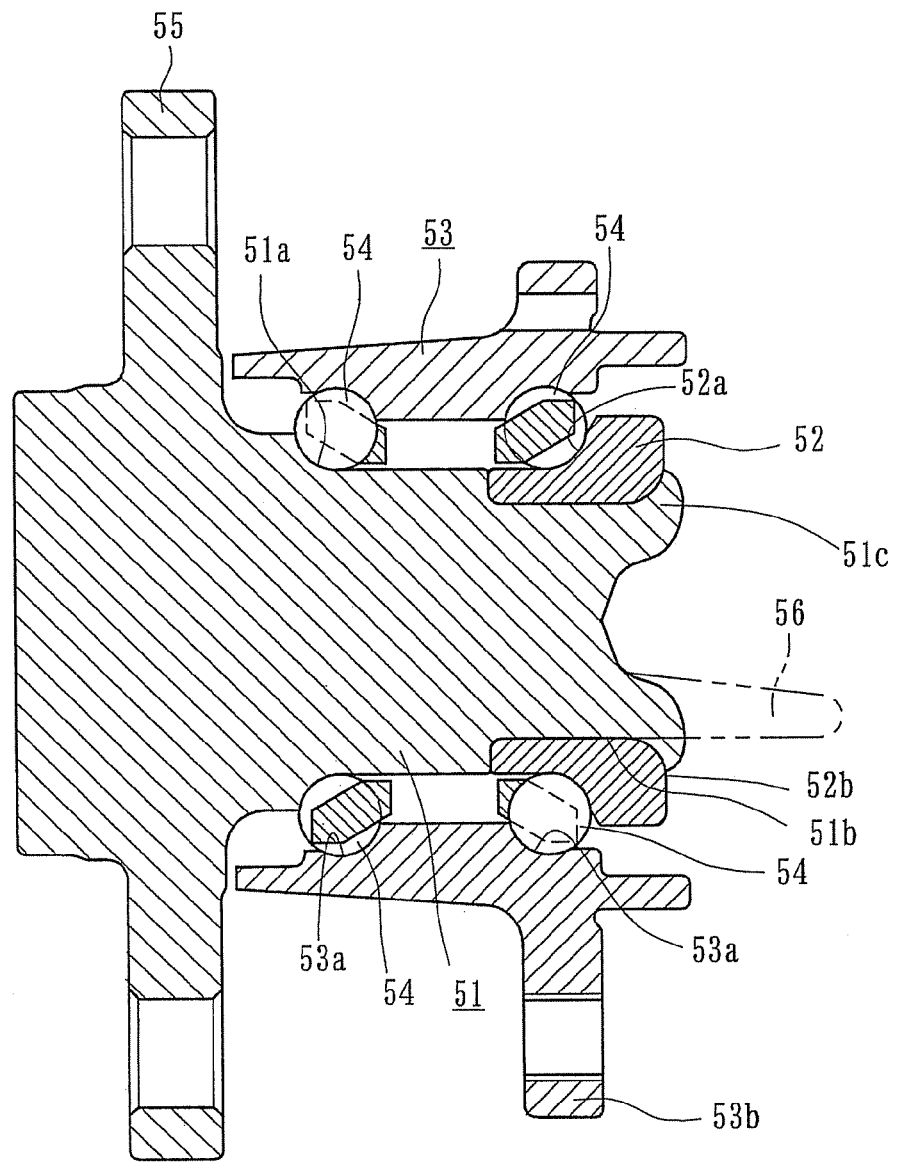

US 8,794,844 B2

WHEEL BEARING APPARATUS FOR A VEHICLE

CROSS-REFERENCE TO RELATED APPLICATIONS

This application is a continuation of International Application No. PCT/JP2009/005845, filed Nov. 4, 2009, which claims priority to Japanese Application No. 2008-284568, filed Nov. 5, 2008. The disclosures of the above applications are incorporated herein by reference.

FIELD

The present disclosure relates to a wheel bearing apparatus that freely rotationally supports a wheel of a vehicle, such as an automobile, relative to a suspension apparatus and, more particularly, to a vehicle wheel bearing apparatus with a self-retaining structure where an inner ring of the bearing apparatus is secured on a wheel hub by swing caulking of the wheel hub. The wheel hub has high durability to suppress the generation of cracks in the caulked portion, due to the caulking work, to increase the strength of the caulked portion.

BACKGROUND

Wheel bearing apparatus is used for driving wheels and driven wheels. It has been developed where the wheel bearing apparatus is intended to be manufactured at a low cost, have a light weight and a compact size to improve fuel consumption. A known representative example of a prior art wheel bearing apparatus for a driven wheel is shown in FIG. 4.

This wheel bearing apparatus is a so called third generation type. It includes a shaft member (wheel hub) 51, an inner ring 52, an outer ring 53 and double row balls 54, 54. The shaft member 51 is integrally formed, on its one end, with a wheel mounting flange 55 to mount a wheel (not shown). The wheel hub outer circumference includes an inner raceway surface 51a. A cylindrical portion 51b axially extends from the inner raceway surface 51a.

The inner ring 52 is formed, on its outer circumference, with an inner raceway surface 52a. The inner ring 52 is press-fit onto the cylindrical portion 51b of the shaft member 51. The inner ring 52 is prevented from coming off the shaft member 51, axially, by a caulked portion 51c. The caulked portion 51c is formed by plastically deforming the end portion of the cylindrical portion 51b of the shaft member 51 radially outward.

The outer ring 53 is formed, on its outer circumference, with a body mounting flange 53b. The outer ring inner circumference includes double row outer raceway surfaces 53a, 53a. The double row balls 54, 54 are rollably contained between the double row outer raceway surfaces 53a, 53a and the inner raceway surfaces 51a, 52a that oppose the double row outer raceway surfaces 53a, 53a.

A cylindrical end 56 has a thickness for forming the caulked portion 51c that is reduced toward its tip end in a condition before caulking deformation of the cylindrical end 56 radially outward. The thickness of the caulked portion 51c pressing the larger end face 52b of the inner ring 52, formed by expanding the cylindrical portion 56 radially outward, is gradually reduced toward its tip end as compared with the base end of the cylindrical end 56.

Thus, it is unnecessary to apply an excessively large force to the cylindrical end 56 to plastically deform it to form the caulked portion 51c. Accordingly, it is possible to prevent the generation of cracks in the caulked portion 51c accompanied with the caulking work as well as to prevent causing an excessive deformation of the diameter of the inner ring 52 that would give influences to factors of durability such as pre-pressure and/or rolling fatigue life. Japanese Laid-open Patent Publication No. 272903/1998

Although it is possible to suppress excessive deformation of the inner ring 52 in the prior art wheel bearing apparatus, micro cracks are sometimes formed at a tip end of the caulked portion 51c. Thus, it is believed that the strength of the caulked portion 51c would be insufficient. Applicants have noticed that such a problem could be solved by appropriately selecting factors for manufacturing the wheel bearing apparatus such as materials, dimensions etc. That is, it is necessary to assure the strength of the caulked portion 51c to prevent it from being broken by an axial load and/or moment load applied to the wheel bearing apparatus since the caulked portion 51c always applies the axial force (pressing force) to the inner ring 52. To assure the strength of the caulked portion 51c, it is necessary to suppress the draft (degree of caulking). The larger the draft the more micro cracks that are caused in the tip end of the caulked portion 51c.

SUMMARY

It is, therefore, an object of the present disclosure to provide a vehicle wheel bearing apparatus that can solve the prior art problems and prevent the generation of cracks in the caulked portion due to its formation. Thus, this improves the strength of the caulked portion as well as the durability of the wheel hub.

To achieve the object of the present disclosure, a vehicle wheel bearing apparatus comprises an outer member, formed on its inner circumference, with double row outer raceway surfaces. An inner member includes a wheel hub and at least one inner ring. The wheel hub is integrally formed with a wheel mounting flange on its one end. The wheel hub outer circumference includes one inner raceway surface. A cylindrical portion axially extends from the inner raceway surface. The inner ring is press-fit onto the cylindrical portion of the wheel hub, via a predetermined interference. The inner ring outer circumference includes an inner raceway surface that opposes the inner side outer raceway surface of the outer member. Double row balls are freely rollably contained, via cages, between the outer raceway surfaces and inner raceway surfaces, respectively, of the outer member and the inner member. The inner ring is axially secured relative to the wheel hub by a caulked portion. The caulked portion is formed by plastically deforming the cylindrical portion radially outward. The wheel hub is formed of medium-high carbon steel that includes carbon of 0.40-0.80% by weight. The ferrite grain size number is selected larger than #3.

The vehicle wheel bearing apparatus has a self-retaining structure where the inner ring is press-fit onto the cylindrical portion of the wheel hub. The inner ring is axially secured on the wheel hub by the caulked portion. The wheel hub is formed from medium-high carbon steel including carbon of 0.40-0.80% by weight. The ferrite grain size number is selected larger than #3. Respective length of the grain crystals, which otherwise forms the propagation path of cracks, is reduced. Thus, it is possible to improve the strength of the wheel hub caulked portion by preventing the generation of cracks during the caulking work.

The wheel hub is formed from medium-high carbon steel including the elements C: 0.50-0.70 wt %, Mn: 0.1-2.0 wt %, Cr: 1.0 wt % or less and residues: Fe and inevitable impurities. This makes it possible to assure the workability of the caulking and improve the rolling fatigue life while improving the hardening ability.

The elemental S included in the wheel hub is limited to 0.02 wt % or less. This prevents the reduction of the ductility and the generation of cracks in the caulked portion by the caulking work.

The elemental Si included in the wheel hub is limited to 0.2 wt % or less. This also prevents a reduction of the ductility and the generation of cracks in the caulked portion by the caulking work.

The draft (La−Lb)/La of the caulking work is set to 0.55 or less. "La" is an amount of projection from the larger end face of the inner ring before the caulking of the cylindrical portion. "Lb" is a height of the caulked portion. This makes it possible to greatly reduce the generation of cracks in the caulked portion.

The wheel hub is directly formed on its outer circumference with one inner raceway surface that opposes the outer side outer raceway surface of the double row outer raceway surfaces. The inner raceway surface and a region from the inner side base of the wheel mounting flange to the cylindrical portion is hardened by high frequency induction hardening to have a surface hardness of 58-64 HRC. The caulked portion is not hardened and remains as is after forging to have a surface hardness of 13-30 HRC. This makes it possible to make the weight and size of the wheel bearing apparatus compact and to prevent the generation of cracks in the caulked portion during the caulking work. Thus, this improves the durability of the wheel hub while increasing the strength of the caulked portion.

A pitch circle diameter of the outer side ball group is set larger than a pitch circle diameter of the inner side ball group. This makes it possible to increase the strength and rigidity of the wheel hub. Thus, this improves the durability of the wheel hub while effectively utilizing the bearing space obtained by the difference of pitch circle diameters. In addition, since the distance between acting points of the double row bearing is expanded by an amount of expansion of the pitch circle diameter of the outer side rolling element (ball) row, it is possible to improve the rigidity and life of the whole wheel bearing.

The number of the outer side balls of the double row balls is set larger than the number of the inner side balls. This makes it possible to increase the loading capacity of the wheel bearing.

The outer diameter of each ball of the outer side ball group of the double row balls is set smaller than the outer diameter of each ball of the inner side ball group. This makes it possible to increase the loading capacity of the wheel bearing together with intending to reduce the weight and size of the wheel bearing.

The vehicle wheel bearing apparatus of the present disclosure comprises an outer member formed, on its inner circumference, with double row outer raceway surfaces. An inner member includes a wheel hub and at least one inner ring. The wheel hub is integrally formed with a wheel mounting flange on its one end. The wheel hub has, on its outer circumference, an axially extending cylindrical portion. The inner ring is press-fit onto the cylindrical portion of the wheel hub, via a predetermined interference. The inner ring is formed, on its outer circumference, with an inner raceway surface that opposes the inner side outer raceway surface of the outer member. Double row balls are freely rollably contained between the outer raceway surfaces and inner raceway surfaces, respectively, of the outer member and the inner member. The inner ring is axially secured relative to the wheel hub by a caulked portion. The caulked portion is formed by plastically deforming the cylindrical portion radially outward. The wheel hub is formed of medium-high carbon steel including carbon of 0.40-0.80% by weight. The ferrite grain size number is selected larger than #3. Respective length of grain crystals, which otherwise form the propagation path of cracks, is reduced. Thus, it is possible to improve the strength of the wheel hub caulked portion by preventing the generation of cracks during the caulking work.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a vehicle wheel bearing apparatus.

FIG. 2(a) is a partially enlarged view of a cylindrical end of the wheel hub of FIG. 1, before the caulking work.

FIG. 2(b) is a partially enlarged view of a cylindrical end of the wheel hub of FIG. 1, after completion of the caulking work.

FIG. 3 is a longitudinal section view of a second embodiment of a vehicle wheel bearing apparatus.

FIG. 4 is a longitudinal section view of a prior art vehicle wheel bearing apparatus.

DETAILED DESCRIPTION

A vehicle bearing apparatus for a wheel comprises an outer member, formed on its outer circumference, with a body mounting flange to be mounted on a knuckle. The outer member inner circumference includes double row outer raceway surfaces. An inner member includes a wheel hub and at least one inner ring. The wheel hub is integrally formed with a wheel mounting flange on its one end. The wheel hub outer circumference includes one inner raceway surface that opposes one of the double row outer raceway surfaces. A cylindrical portion axially extends from the inner raceway surface. The inner ring is press-fit onto the cylindrical portion of the wheel hub, via a predetermined interference. The inner ring outer circumference includes an inner raceway surface that opposes the inner side outer raceway surface of the outer member. Double row balls are freely rollably contained, via cages, between the outer raceway surfaces and inner raceway surfaces, respectively, of the outer member and the inner member. The inner ring is axially secured relative to the wheel hub by a caulked portion. The caulked portion is formed by plastically deforming the cylindrical portion radially outward. The wheel hub is formed from medium-high carbon steel including carbon of 0.40-0.80% by weight. The steel includes elements C: 0.50-0.70 wt %, Mn: 0.1-2.0 wt %, Cr: 1.0 wt % or less, Si: 0.2 wt % or less, S: 0.02 Wt % or less, and residues: Fe and inevitable impurities. The ferrite grain size number is selected larger than #3. The draft (La−Lb)/La of the caulking work is set to 0.55 or less. "La" is an amount of projection from the larger end face of the inner ring before the caulking of the cylindrical portion. "Lb" is a height of the caulked portion.

FIG. 1 is a longitudinal section view of a first embodiment of a vehicle wheel bearing apparatus. FIG. 2(a) is a partially enlarged view of the cylindrical end of the wheel hub of FIG.

1 before the caulking work. FIG. 2(b) is a partially enlarged view of the cylindrical end of the wheel hub of FIG. 1 after completion of the caulking work. In the description below, a distal side of the wheel bearing apparatus when it is mounted on a vehicle is referred to as the "outer side" (a left side in FIG. 1). A proximal side of the wheel bearing apparatus is referred to as the "inner side" (a right side in FIG. 1).

The vehicle wheel bearing apparatus shown in FIG. 1 is a third generation type used for a driven wheel. The bearing apparatus includes an inner member 1, an outer member 10, and double row rolling elements (balls) 6, 6 that are rollably contained between the inner and outer members 1, 10. The inner member 1 includes a wheel hub 2 and an inner ring 3. The inner ring 3 is press fit onto the wheel hub 2, via a predetermined interference.

The wheel hub 2 is integrally formed with a wheel mounting flange 4 at its outer-side end. Hub bolts 5 are equidistantly arranged along the periphery of the flange. The wheel hub 2 outer circumference includes one (outer-side) inner raceway surface 2a. A cylindrical portion 2b extends from the inner raceway surface 2a through a shoulder portion 11. An inner ring 3 is press fit onto the cylindrical portion 2b. The inner ring outer circumference includes the other (inner side) inner raceway surface 3a.

Circular apertures 4a are formed between the hub bolts 5 on the wheel mounting flange 4. The circular apertures 4a not only contribute to the reduction of the weight of the wheel hub 2 but enable easy fastening of the knuckle bolts (not shown), using tools, without disturbing the brake rotor (not shown) or the wheel mounting flange 4 under a condition where the brake rotor is secured on the wheel hub 2 during the assembling step of the wheel bearing apparatus. Thus, it is possible to simply secure the outer member 10 onto the knuckle (not shown) and, accordingly, improve the assembling workability.

The caulking portion 2c is formed to abut the inner ring 3 against the shoulder 11 of the wheel hub 2 when the end of the cylindrical portion 2b is plastically deformed radially outward. That is, the inner ring 3 is axially secured relative to the wheel hub 2 under a predetermined bearing pre-pressurized condition. The inner ring 3 is sandwiched between the caulked portion 2c and the shoulder 11 of the wheel hub 2. The caulked portion 2c is plastically deformed while being in close contact with the inner side larger end face 3b of the inner ring 3. Thus, this assures that a desired axial force will press against the larger end face 3b of the inner ring 3.

The outer member 10 is integrally formed, on its outer circumference, with a body mounting flange 10b to be mounted on a body (not shown) of a vehicle. The outer element inner circumference includes outer raceway surfaces 10a, 10a. Double row rolling elements (balls) 6, 6 are rollably held by cages 7, 7 between the outer and inner raceway surfaces 10a, 10a and 2a, 3a. Seals 8, 9 are mounted within the annular opening spaces formed between the outer member 10 and the inner member 1. The seals 8, 9 prevent leakage of grease contained within the bearing and the entry of rain water and dust into the bearing from the outside.

Although the structure shown here is a third generation type wheel bearing apparatus for a driven wheel, where the inner raceway surface 2a is directly formed on the outer circumference of the wheel hub 2, the present disclosure is not limited to only such a structure. It is possible to apply the present disclosure to a wheel bearing apparatus of the first or second generation type for both a driven wheel and a driving wheel, where a pair of inner rings is press-fit onto the cylindrical portion of the wheel hub. In addition, although shown with a double row angular contact ball bearing using balls as the rolling elements 6, 6, it is possible to use a double row tapered roller bearing using tapered rollers as the rolling elements 6, 6.

The wheel hub 2 is made from medium-high carbon steel including carbon of 0.40-0.80% by weight such as S53C. The wheel hub 2 is hardened by induction hardening so that a region including the inner raceway surface 2a, from the inner-side base 4b of the wheel mounting flange 4 where the outer side seal 8 slidably contacts it, to the cylindrical portion 2b is hardened by induction hardening to have a surface hardness of 58-64 HRC. The caulked portion 2c remains as is, after forging, with its surface hardness of 13-30 HRC.

The inner ring 3 and the rolling elements 6 are made from high carbon chrome steel such as SUJ2. They are hardened to their cores by dip quenching to have a surface hardness of 58-64 HRC. Similarly to the wheel hub 2, the outer member 10 is made of medium-high carbon steel including carbon of 0.40-0.80% by weight such as S53C. At least the double row outer raceway surfaces 10a, 10a are hardened by induction hardening to have a surface hardness of 58-64 HRC.

As previously described, the wheel hub 2 is preferably formed from medium-high carbon steel including elemental C: 0.40-0.80 wt % (preferably 0.50-0.70 wt %), Mn: 0.1-2.0 wt %, Cr: 1.0 wt % or less, Si: 0.2 wt % or less, S: 0.02 Wt % or less, and residues: Fe and inevitable impurities. In addition, alloy elements Mn, Si, Cr, S other than C are added into the steel material. Mn is added at an amount of 0.1-2.0 wt % to improve the easiness of quenching and to form the predetermined hardened layers, as previously mentioned. If the amount of Mn is less than 0.1 wt %, the thickness of the hardened layers obtained is not sufficient. On the other hand, if the amount of Mn exceeds 2.0 wt %, the workability will be diminished.

The amount of Cr is 1.0 wt % or less. If the amount of Cr exceeds 1.0 wt %, the workability is diminished.

Similarly to Mn and Cr, Si has an effect to improve the ease of quenching. However, it is limited to 0.2 wt % or less because it diminishes the ductility during the plastic deformation work.

The medium-high carbon steel forming the wheel hub 2 has an austenite structure. Although the size of the austenite crystal grains is determined by factors such as a temperature and a holding time duration etc. at high temperature, the size of the crystal grains is not changed by a drop of temperature, and only the structure is transformed from the austenite structure to a pearlite structure. The structure of the temperature drop condition is the ferrite structure+pearlite structure where the ferrite is precipitated around the grain boundary of the pearlite structure.

The grain size of the ferrite crystal of the wheel hub 2 is limited to 3 or more. The grain size of the ferrite crystal means a size of the pearlite structure surrounded by the ferrite crystal grains that can be observed by coming out of grain boundary while corroding the ferrite using an ethanol nitrate solution. The grain size of the ferrite crystal is the grain size number of crystal grains judged by the examination defined in JIS G0551 and means so-called the former grain size number of ferrite crystal grains.

Since the ferrite grain size number is selected larger than #3, respective length of grain crystals that otherwise form the propagation path of cracks is reduced. Thus, it is possible to improve the strength of the wheel hub i.e. caulked portion by preventing the generation of cracks during the caulking work.

Accordingly, it is possible to provide a wheel bearing apparatus that can prevent the generation of cracks in the caulked portion 2c during the caulking work. Also, it is possible to assure the durability of the wheel hub 2 while increasing the strength of the caulked portion 2c by limiting an amount of added Si and S that would diminish the ductility during the plastic deforming work and by limiting the ferrite grain size to 3 or more.

In addition, the applicant has noticed that the draft is important in order to prevent the generation of cracks during the caulking work. As shown in FIGS. 2(a) and 2(b) the draft is defined as (La−Lb)/La. "La" is a length amount of the projection 12 from the larger end face 3b of the inner ring 3 before the caulking of the cylindrical portion 2b. "Lb" is a height of the caulked portion 2c. Accordingly, the draft (La−Lb)/La is set at 0.55 or less.

It has been found that the generation of cracks can be greatly reduced by setting the draft at 0.55 or less according to the confirmation examination performed by the applicant although some variation is found in accordance with the bearing specification. It has been found that the generation ratio of the cracks in the caulked portion 2c can be reduced to 1/10 by changing the draft from 0.57 to 0.47 in models where the generation ratio of cracks is high.

FIG. 3 is a longitudinal section view of a second embodiment of a vehicle wheel bearing apparatus. This embodiment is basically different from the first embodiment only in a structure of the pitch circle diameter of the double row rolling elements (balls). Accordingly, the same reference numerals are used to identify parts of this embodiment that have the same functions as those of the first embodiment.

The vehicle wheel bearing apparatus of this embodiment is a third generation type used for a driven wheel. The bearing apparatus includes an inner member 13, an outer member 14, and double row rolling elements (balls) 6a, 6 rollably contained between the inner and outer members 13, 14. The inner member 13 includes the wheel hub 15 and an inner ring 3 press fit onto the wheel hub 15, via a predetermined interference.

The wheel hub 15 is integrally formed with a wheel mounting flange 4 at its outer-side end. The wheel hub outer circumference includes one (outer side) inner raceway surface 15a. A cylindrical portion 2b extends from the inner raceway surface 15a through a shaft portion 15b.

The inner ring 3 is formed, on its outer circumference, with the other (inner side) inner raceway surface 3a. The inner ring 3 is adapted to be press-fit onto the cylindrical portion 2b of the wheel hub 15 to form a double row angular contact ball bearing of a back-to-back duplex type. The inner ring 3 is axially secured by a caulked portion 2c. The caulked portion 2c is formed by plastically deforming the end of the cylindrical portion 2b. The rolling elements 6a are made of high carbon chrome steel such as SUJ2. They are hardened to their cores by dip quenching to have a surface hardness of 58-64 HRC.

The wheel hub 2 is made from medium-high carbon steel including carbon of 0.40-0.80% by weight such as S53C. The wheel hub 2 is hardened by induction hardening so that a region, including the inner raceway surface 15a from the inner side base 4c of the wheel mounting flange 4 to the cylindrical portion 2b, is hardened to have a surface hardness of 58-64 HRC.

The outer member 14 is integrally formed, on its outer circumference, with a body mounting flange 10b. The outer member inner circumference includes an outer side outer raceway surface 14a that oppose the inner raceway surface 15a of the wheel hub 15. Also, it includes an inner side outer raceway surface 10a that oppose the inner raceway surface 3a of the inner ring 3. Double row rolling elements (balls) 6a, 6 are contained and rollably held, by cages 7a, 7, between the outer and inner raceway surfaces. Seals 8, 9 are mounted within of annular opening spaces formed between the outer member 14 and the inner member 13. The seals 8, 9 prevent leakage of grease contained in the bearing and the entry of rain water and dust into the bearing from the outside.

The outer member 14 is made from medium-high carbon steel including carbon of 0.40-0.80% by weight such as S53C. The double row outer raceway surfaces 14a, 10a are hardened to have a surface hardness of 58-64 HRC.

According to this embodiment, a pitch circle diameter PCDo of the outer side ball group 6a is set larger than a pitch circle diameter PCDi of the inner side ball group 6 (PCDo>PCDi). The outer diameter do of each ball 6a of the outer side ball group is set smaller than the outer diameter di of each ball 6 of the inner side ball group (do<di). In addition, the number Zo of the outer side balls 6a is set larger than the number Zi of the inner side balls 6 (Zo>Zi).

The outline of the wheel hub 15 continues from the groove bottom of the inner raceway surface 15a to the cylindrical portion 2b through the axially extending shaft portion 15b, a tapered step portion 15c and a shoulder 15d. The inner ring 3 abuts against the shoulder 15d. In the outer member 14, the diameter of the outer side outer raceway surface 14a is formed larger than that of the inner side outer raceway surface 10a because of the difference of the pitch circle diameters PCDo, PCDi. The outline of the outer member 14 continues from the outer side outer raceway surface 14a to a shoulder 14d of the inner side outer raceway surface 10a through a cylindrical shoulder 14b and an arcuate stepped portion 14c. This makes it possible to make the size and weight of the wheel bearing apparatus compact and prevent the generation of cracks in the caulked portion 2c during the caulking work. Thus, this improves the durability of the wheel hub 15 while increasing the strength of the caulked portion 2c. Furthermore, it is possible to increase the strength and rigidity of the wheel hub 15. Thus, this improves the durability of the wheel hub 15 while effectively utilizing the bearing space obtained by the difference of pitch circle diameters PCDo, PCDi. In addition, since the distance between acting points of the double row bearing is expanded by an amount of expansion of the pitch circle diameter PCDo of the outer side rolling element (ball) row, it is possible to improve the rigidity and life of the wheel bearing.

The vehicle wheel bearing apparatus can be applied to any of the bearing apparatus of the first through third generation types of a self-retaining structure where the inner ring is press-fit onto the cylindrical portion of the wheel hub and axially secured by plastically deforming the end of the cylindrical portion.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
    an outer member formed with double row outer raceway surfaces on its inner circumference;
    an inner member including a wheel hub and at least one inner ring, the wheel hub is integrally formed with a wheel mounting flange on one of its ends, the wheel hub has an outer circumference with an inner raceway surface and an axially extending cylindrical portion, the at least one inner ring is press-fit onto the cylindrical portion of the wheel hub, an outer circumference of the at least one inner ring includes an inner raceway surface that opposes one of the double row outer raceway surfaces of the outer member;

double row balls are freely rollably contained between the outer raceway surfaces and inner raceway surfaces, respectively, of the outer member and the inner member;

the at least one inner ring is axially secured relative to the wheel hub by a caulked portion, the caulked portion is formed by deforming the cylindrical portion radially outward;

the wheel hub is formed of medium-high carbon steel including carbon of 0.40-0.80% by weight and with a ferrite grain size number that is selected larger than #3; and a draft (La−Lb)/La of a caulking work is set at 0.55 or less, "La" is a length amount of a projection from a larger end of the at least one inner ring to a tip of the projection, a recess is formed with a bottom at a base of the projection, the bottom is substantially coplanar with a larger end face of the at least one inner ring, the projection has a substantially constant thickness extending beyond the bottom of the recess and the larger end face of the at least one inner ring before the caulking of the cylindrical portion and "Lb" is a height of the caulked portion which is the thickness of the caulked portion from the bottom of the recess and the larger end face of the at least one inner ring after the caulking and an entire portion extending beyond the bottom of the recess of the cylindrical portion is caulked, wherein the vehicle wheel bearing apparatus prevents the generation of cracks in the caulked portion during the caulking work.

2. The vehicle wheel bearing apparatus of claim 1, wherein the medium-high carbon steel further including carbon: 0.50-0.70 wt %, manganese: 0.1-2.0 wt %, chromium: 1.0 wt % or less and residues: iron and inevitable impurities.

3. The vehicle wheel bearing apparatus of claim 2, further comprising sulfur in the wheel hub in the amount limited to 0.02 wt % or less.

4. The vehicle wheel bearing apparatus of claim 2, further comprising silicon in the wheel hub in an amount limited to 0.2 wt % or less.

5. The vehicle wheel bearing apparatus of claim 1, wherein the wheel hub is directly formed on its outer circumference with the inner raceway surface that opposes one of the double row outer side outer raceway surfaces of the double row outer raceway surfaces, the inner raceway surface and a region from an inner side base of the wheel mounting flange to the cylindrical portion are hardened by induction hardening to have a surface hardness of 58-64 HRC, the caulked portion is not hardened and remained as is after forging to have a surface hardness of 13-30 HRC.

6. The vehicle wheel bearing apparatus of claim 1, wherein a pitch circle diameter of an outer side ball group is set larger than a pitch circle diameter of an inner side ball group.

7. The vehicle wheel bearing apparatus of claim 6, wherein a number of outer side balls of the double row balls is set larger than a number of inner side balls.

8. The vehicle wheel bearing apparatus of claim 6, wherein an outer diameter of each ball of the outer side ball group of the double row balls is set smaller than an outer diameter of each ball of the inner side ball group.

9. The vehicle wheel bearing apparatus of claim 7, wherein an outer diameter of each ball of the outer side ball group of the double row balls is set smaller than an outer diameter of each ball of the inner side ball group.

\* \* \* \* \*